No. 854,228. PATENTED MAY 21, 1907.
M. F. MANGELSDORFF.
PROCESS OF GENERATING PRODUCER GAS.
APPLICATION FILED APR. 24, 1906.
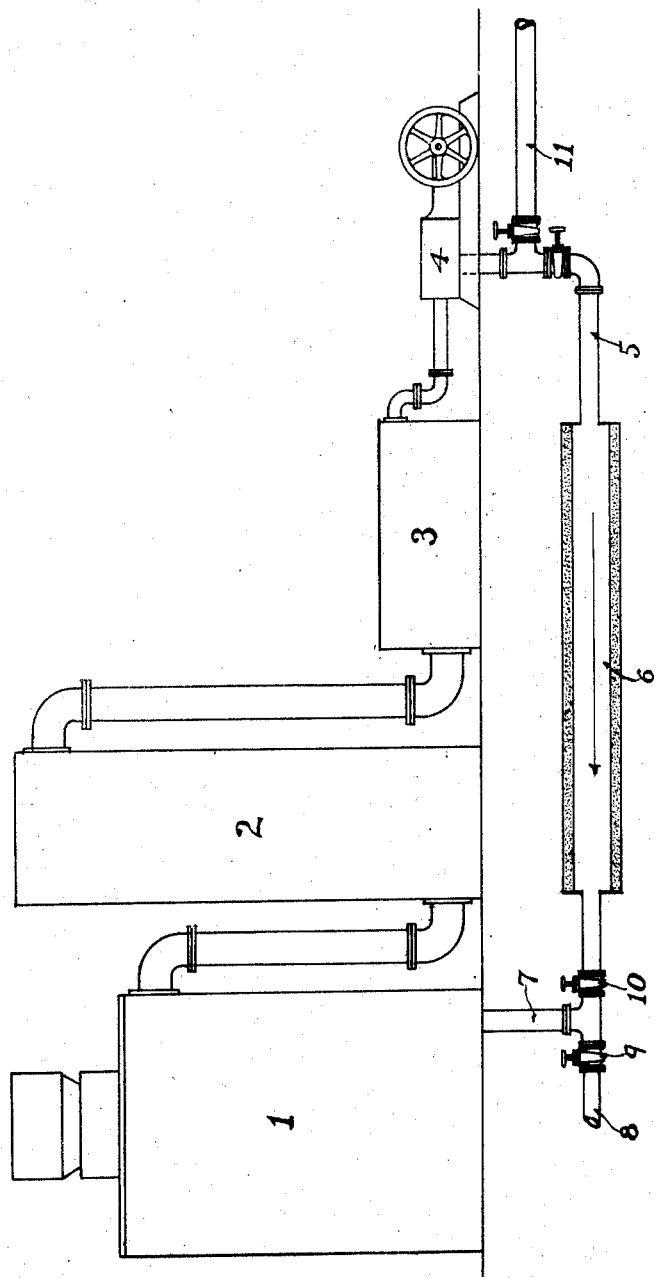

UNITED STATES PATENT OFFICE.

MAX F. MANGELSDORFF, OF NEW YORK, N. Y., ASSIGNOR TO COMBUSTION UTILITIES COMPANY, A CORPORATION OF NEW YORK.

PROCESS OF GENERATING PRODUCER-GAS.

No. 854,228.     Specification of Letters Patent.     Patented May 21, 1907.

Application filed April 24, 1906. Serial No. 313,478.

*To all whom it may concern:*

Be it known that I, MAX F. MANGELSDORFF, a citizen of the United States, and a resident of New York, in the county of New York and State of New York, have invented certain new and useful Improvements in Processes of Generating Producer-Gas, of which the following is a specification.

This invention relates to process of generating producer gas by the passage through a bed of ignited fuel of specially treated products of combustion, and has for its object the production of combustible gas low in hydrogen and containing only a modicum of nitrogen.

My invention consists in treating products of combustion such as chimney gases or exhaust gases from gas engines to separate therefrom a considerable portion of the nitrogen which they normally contain and in passing these treated products through a deep fire bed to reduce the oxygen and carbon dioxid to carbon monoxid, which gas with whatever nitrogen may accompany it is carried to the place of consumption and utilized for heating or generation of power etc.

One embodiment of my invention and a preferred form thereof is depicted in the accompanying diagrammatic drawing which shows in elevation a gas-power apparatus or organization adapted for carrying out my process.

In the drawing 1 is a gas producer of a suitable type.

2 is a scrubber for cooling and cleaning the gas.

3 is a purifier for final purification and drying to a greater or lesser degree.

4 is a gas engine or internal combustion motor, having an exhaust pipe 5 leading to the diffusion chamber 6. The diffusion chamber is made of some semi-permeable substance and I prefer to prepare it in the following manner:—I take a sheet of damask or linen and wrap it several times around a tube of stiff wire screening and sew it firmly to the latter. I prepare a compound by dissolving one pound of aluminium resinate and one pint of Chinese wood oil in three gallons spirits of turpentine. The cloth is impregnated with this solution, dried and aged for at least one hundred days to acquire the requisite porosity and diffusive action. It is then ready for use in the manner to be hereinafter specified. From the diffusion tube 6 a pipe 7 leads to the producer 1. In pipe 7 is an air inlet 8.

9 and 10 are dampers or valves.

11 is an outlet pipe for surplus products of explosion.

The operation is as follows:—A deep bed of ignited fuel, such as anthracite or coke or lignite or soft coal etc. is formed in the producer 1. Air is introduced through the inlet 8, the damper 9 being open and 10 being closed for a time until the fire is of the proper temperature. 10 is then opened and 9 is partly or wholly closed. The gas produced passes through the scrubber and purifier and enters the engine, being there exploded with air in the usual manner except that high compression is used as the gas is free or practically free from hydrogen. The exhaust gases in part pass away through the pipe 11, but a portion are entered into the diffusion chamber where part of the nitrogen is removed by the diffusive action of the membrane. Deprived of this nitrogen the exhaust gas is made richer in carbon dioxid and the treated exhaust gas is entered with air into the producer chamber. Usually I enter the draft under the grate but under certain circumstances I introduce the exhaust gas at different levels in the producer so that the various zones of the fire bed may receive exhaust gas of the same composition.

For continuous operation I make up a mixture of exhaust gas and air in such proportions as to prevent the fire bed from clinkering and yet maintain an efficient gasifying temperature. When however I operate on the intermittent plan, similar to water gas manufacture, I admit only air through the pipe 7 and heat the fuel bed to incandescence. Then I shut off the air and admit products of combustion until the temperature of the producer falls to a low point when the air blow is repeated, etc. The producer may be up draft or down draft and may be operated on the suction or pressure principle. Fan blowers or positive pressure blowers or jet inductors may be used for causing the flow of gases in the desired direction. Two or more producers may be joined in tandem or otherwise and the gas produced by an up draft in one may be further enriched in carbon monoxid by downward passage through another producer, as will be evident to those skilled in the art to which this invention appertains without further description or illustration.

While the gas which I thus prepare, containing only one combustible element, is especially suited for gas engines and permits of a compression of 200 pounds or more yet I do not limit myself to such application as the invention is of great value in heating furnaces and the like and I lay claim to its application in this manner. The scrubbing and purifying apparatus is unnecessary in furnace work.

I am aware of the use of gases high in carbon dioxid from lime kilns etc., for gas producer operation and I do not claim such as my invention. I believe however that I am the first to discover that the greater diffusive power of nitrogen over carbon dioxid permits of its removal to a considerable extent from products of combustion by passage thereof through suitable diffusion apparatus and that such a treated gas is useful for generating a combustible gas containing a very high percentage of carbon monoxid.

The intermittent method above described is preferable when a gas containing a maximum of carbon monoxid is desired. The cost of generation is however slightly greater than that of the continuous method which, be it said, affords a gas of excellent quality for gas engines.

For gas engines employed in marine propulsion this invention is eminently adapted.

If the gases in the diffusion tube are under considerably diminished pressure, as sometimes happens, a jacket (not shown) may be placed around the tube and suction applied to aid in the passage of the nitrogen through the semi permeable walls of the tube.

I am able also to prepare diffusion tubes of other material than the above specified composition. Dry wood pulp or asbestos fiber formed into shape and impregnated with a suitable compound is efficient. I do not limit myself to the use of the resinate compound described above as other bodies such as sulfate of lime precipitated *in situ* are fairly effective. Neither do I limit myself to the use of a diffusion tube as other means for separating nitrogen from carbon dioxid may be employed, such for instance as absorbing agents.

What I claim is:—

1. The process of producing gas which consists in removing a portion of the nitrogen from products of combustion to enrich the same with regard to carbon dioxid, and in then transmitting the enriched products through a bed of ignited fuel.

2. The process of producing gas which consists in transmitting products of combustion through a porous-walled passage to diffuse away a portion of their nitrogen and in then transmitting the treated products through a bed of ignited fuel.

3. The process of producing gas which consists in diffusing away nitrogen from products of combustion and in then transmitting the residual treated products through a bed of ignited fuel.

4. The process of making and using gas which consists in transmitting products of combustion from a gas engine through a porous-walled passage, in then transmitting the thus-treated products through a bed of ignited fuel, and in then feeding the produced gas to a gas engine.

5. The process of producing gas which consists in transmitting products of combustion through a porous-walled passage at a pressure greater than that prevailing exteriorly of said passage, and in then transmitting the thus-treated products through a bed of ignited fuel.

6. The process of producing gas which consists in removing a portion of the nitrogen from products of combustion, and in alternately blowing up a body of ignited fuel with air and with the thus-treated products of combustion.

Signed at New York in the county of New York and State of New York this 21st day of April A. D. 1906.

MAX F. MANGELSDORFF.

Witnesses:
FLETCHER P. SCOFIELD,
FREDK. B. MULCOX.